Figure 1:
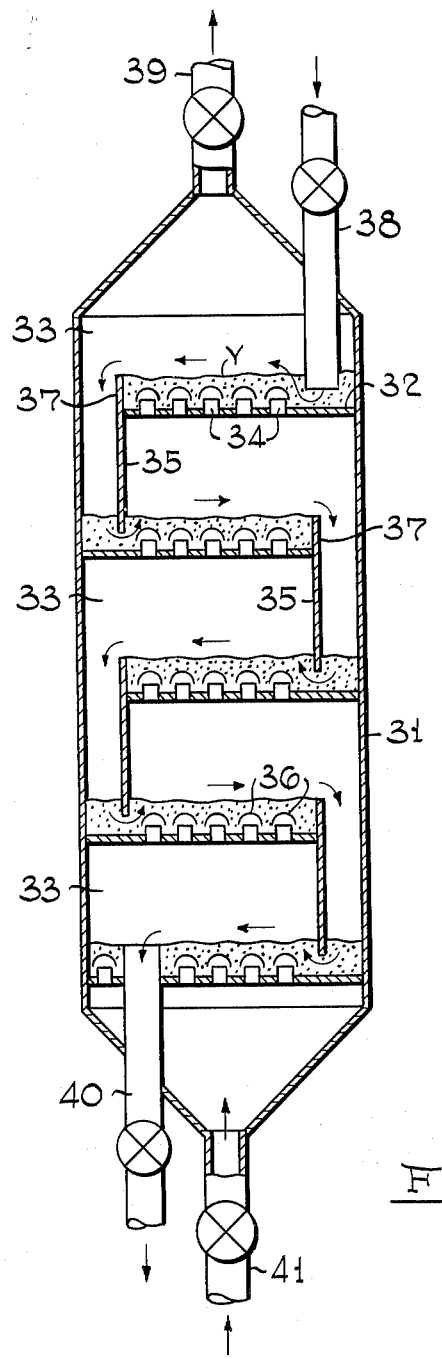

Aug. 30, 1955 G. O. HILLARD, JR 2,716,587
PROCESS AND APPARATUS FOR CONTACTING SOLIDS AND VAPORS
Filed Nov. 14, 1950 2 Sheets-Sheet 1

George O. Hillard, Jr. Inventor
By W. O. J Heihman Attorney

Aug. 30, 1955      G. O. HILLARD, JR      2,716,587
PROCESS AND APPARATUS FOR CONTACTING SOLIDS AND VAPORS
Filed Nov. 14, 1950      2 Sheets-Sheet 2

George O. Hillard, Jr. Inventor
By W. O. Heilman Attorney

United States Patent Office 2,716,587
Patented Aug. 30, 1955

2,716,587

PROCESS AND APPARATUS FOR CONTACTING SOLIDS AND VAPORS

George O. Hillard, Jr., Baton Rouge, La., assignor to Esso Research and Engineering Company, a corporation of Delaware Application November 14, 1950, Serial No. 195,676

3 Claims. (Cl. 23—1)

The present invention is concerned with a method and apparatus for contacting vapors with fluidized, finely divided solid particles. The invention is more particularly concerned with a method and apparatus for contacting fluidized solid particles and vapors in a series of superimposed contact chambers or zones in a contacting vessel, wherein the fluidized solid particles are passed downwardly in countercurrent relationship to the ascending vapors or gases. In accordance with the present invention, vapors or gases are passed through a reaction zone or vessel in a direction countercurrent to the flow of finely divided fluidized contacting materials. The vapors are passed upwardly through the reaction zone and the finely divided solid particles are passed downwardly under conditions wherein the velocity of upflowing vapor or gas is so adjusted that the solid particles are fluidized and simulate a liquid. In accordance with the present invention, the weir of the downcomer for the respective superimposed contact chambers comprises a meshed means in order to improve the fluidized solid flow from the respective chambers.

It is well known in the art to conduct various reactions employing fluidized solid particles wherein gases are contacted with the same.

In these reactions, the solid particles are maintained in a fluidized state by the velocity of upflowing gases which, for example, is normally in the range of from about 0.5 to 3 ft. per second. The size of the catalyst particles is usually below about 200 microns. Usually, at least 50% of the catalyst has a particle size in the range from about 20–80 microns. In fluidized solid operations of this character, it is also known to use bubble cap trays wherein the upflowing gases move from one zone to another through bubble caps or their equivalent into a dense bed of fluidized solids disposed immediately above the respective trays. These solids flow across the tray and across a weir into a downcomer and passes into the zone below. The height of the dense bed above the respective tray is determined by the weir height. While operations of this sort have been entirely satisfactory, one disadvantage is that an entrapment of the gas occurs as the dense phase fluidized particles pass over the weir. In the operation of fluidized solids across bubble cap plates, the velocity of the solids across the top of a normal vertical weir is such that the solids entrap gases and carry these gases into the downcomer. This results in considerable gas being trapped in the downcomer. Some gas passes back through the overflowing solids causing interference with this flow, creates back flow across vapor space above the plate and also creates considerable turbulence. The trapped gas in the dense phase in the downcomer also results in a lower density in the downcomer and necessitates a greater plate spacing than if higher densities are obtained.

In accordance with the present invention, by employing a weir comprising a meshed means improved disengaging of gas is obtained and higher solid throughputs are secured.

The invention and its objects may be more fully understood from the following description when read in conjunction with the accompanying drawings.

Figure 2:
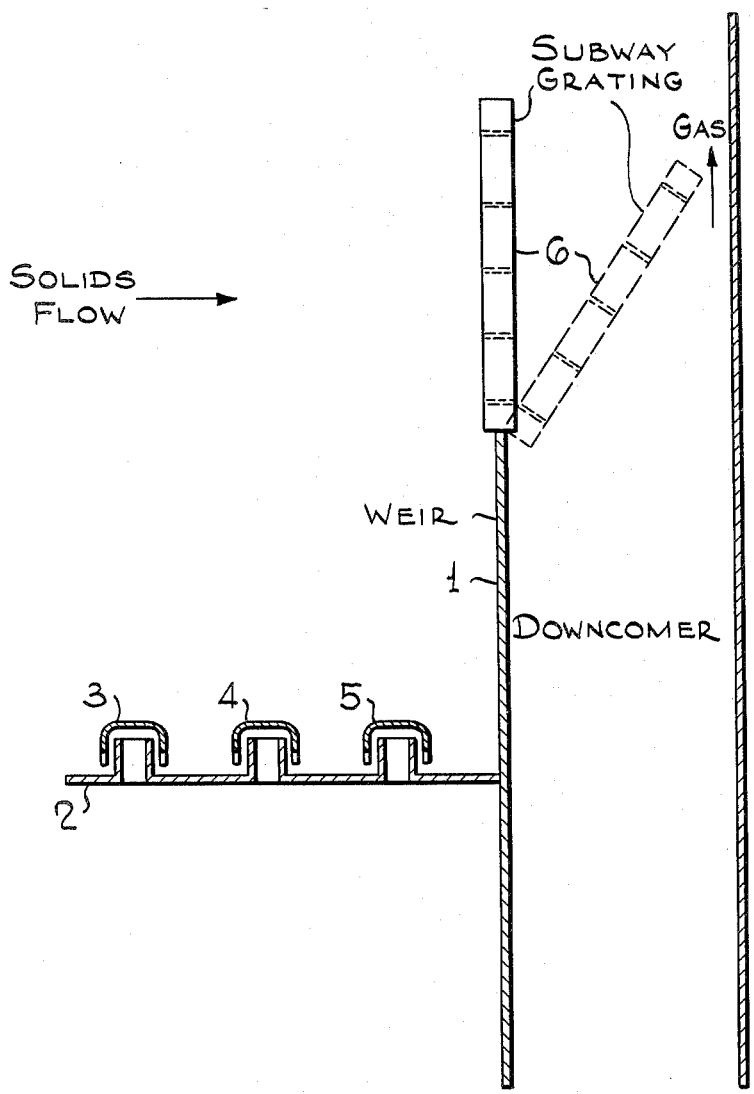

Figure 1 is a semi-diagrammatic illustration showing a typical contacting vessel in vertical section, while Figure 2 illustrates the weirs in accordance with the present invention.

Referring specifically to Figure 1, the numeral 31 designates a fluidized solids bubble tray column or contacting vessel. The vessel 31 is conventionally provided with a series of vertically spaced, transverse, perforated plate elements 32, forming a vertical series of superimposed, contact chambers or zones. These chambers or zones are in communication one with another by way of the passageways 34 formed by the plate perforations, and downcomers 35 disposed at alternate sides of the vessel from plate to plate. The downcomers extend from the surface of one plate downwardly into vertically spaced relation to the surface of the plate next below. As shown in Figure 1, the passageways 34 through the plate are each provided with bubble cap element 36. In addition, each plate 32 is provided with a weir member 37, at the entrance to the downcomer 35, extending upwardly from the plate surface to a level above the lower end of the downcomer from the plate next above. The vessel is also provided with an inlet pipe 38 for fluidized solid material extending into the upper end of of the vessel, and terminating in spaced relation to the uppermost plate 32 below the upper end of the weir 37 for that plate. An outlet from the vessel for gaseous materials is provided as by conduit 39. At the lower end of the vessel is an outlet 40 for finely divided solid materials, and an inlet 41 for gaseous materials to be passed through the vessel.

Referring specifically to Figure 2, the weir of the present invention is illustrated. Gases from the zone below flow upwardly through the chimneys on bubble cap plate 2 containing bubble caps 3, 4 and 5. These gases flow into a dense phase of fluidized solid particles on the top of plate 2. The height of the dense phase of the fluidized particles is maintained by weir 1, comprising a lower solid section and an upper meshed section 6. As the solids flow through the upper meshed section, entrained or entrapped gases are freed, thus preventing their passage downwardly through the downcomer with the solid particles moving to the zone below. As shown, the upper meshed section may be vertical with respect to the plate or may be disposed at an angle over the area of the downcomer.

The present invention is broadly concerned with increasing the efficiency of fluidized contacting zone wherein bubble cap trays or their equivalent are utilized. The improvement is secured by preventing the entrainment of gases by the nappe of the solids flowing over the weir. In accordance with the present invention, interference with the nappe of the solids flowing over the weir is substantially reduced by employing a weir comprising a meshed section.

As pointed out in the operation of fluidized solids in a bubble cap tower, considerable entrainment of gases over the weir to the downcomer occurs. This results in a large upflow of gas from the downcomer when the gas does separate from the solids and actually results in a loss of capacity or throughput. It sometimes results in a countercurrent flow or recirculation of solids across the plate. This can be prevented by installing some device at the top of the weir which will not interfere with the flow of solids but will cause the gas bubbles to break up and disengage prior to entering the downcomer. Such a device could be mesh wire of one to eight mesh, subway grating, crinkled wire screen or similar material. The grating or other type mesh wire would be installed at top of weir vertically to 45° over the downcomer. The grating may comprise an integral part of the weir or may be a separate and distinct section disposed immediately above the weir and extending its entire length. The height of the meshed section will vary appreciably but in general it will be about one-third to one-half of the height of the solid section.

Having described the invention, it is claimed:

1. In an operation wherein downflowing fluidized solids countercurrently contact upflowing gases in a series of superimposed contact chambers in a contacting vessel said chambers being separated by means of perforated plates and wherein a dense phase of fluidized solids extends across the top of each plate, and wherein upflowing vapors pass through said perforations into and through said dense phase, the improvement which comprises passing fluidized solids from the dense phase of one plate to the dense phase of a lower plate by means of a downcomer, and flowing said solids into said downcomer from the upper volume of said dense phase in a multiplicity of discrete streams at different initial levels some of which are appreciably below the top of said dense phase whereby entrainment of gases by said solids in said downcomer is substantially prevented.

2. In apparatus of the character described, the combination of an upright tower vessel, a plurality of transverse perforated bubble-cap plates each adapted to support a mass of fluidized finely divided solids, means for passing a flow of gasiform fluid through said perforations to maintain said fluidization, a substantially vertical weir structure associated with each plate and defining a downcomer conduit arranged to maintain a fluidized dense bed of solids of substantial depth on the associated plate and to control flow of said dense bed of solids from one plate to the next below in cascade fashion, and an upwardly extending foraminate member atop each weir to subdivide the dense stream of solids overflowing said weir into a plurality of small streams whereby to break up large bubbles and reduce entrainment of the gasiform fluid in said downflowing solids.

3. Apparatus according to claim 2 wherein the upwardly extending foraminate member is inclined from the vertical in the direction of overflow by an angle not exceeding 45°.

References Cited in the file of this patent

UNITED STATES PATENTS

| | | |
|---|---|---|
| 2,116,933 | Ragatz | May 10, 1938 |
| 2,436,225 | Ogorzaly | Feb. 17, 1948 |
| 2,444,990 | Hemminger | July 13, 1948 |
| 2,472,502 | Tyson | June 7, 1949 |
| 2,481,439 | Ogorzaly | Sept. 6, 1949 |
| 2,502,953 | Jahnig | Apr. 4, 1950 |
| 2,617,708 | Peery | Nov. 11, 1952 |